United States Patent
Slattery et al.

(10) Patent No.: US 11,873,873 B2
(45) Date of Patent: Jan. 16, 2024

(54) SYSTEM AND METHOD OF MAKING AN ENHANCED BRAKE ROTOR WITH IMPROVED WEAR RESISTANCE

(71) Applicant: GM Global Technology Operations LLC, Detroit, MI (US)

(72) Inventors: Benjamin Everest Slattery, Tecumseh (CA); Kevin P. Callaghan, Bloomfield Hills, MI (US); Mark T. Riefe, Brighton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 105 days.

(21) Appl. No.: 17/721,661

(22) Filed: Apr. 15, 2022

(65) Prior Publication Data

US 2023/0332658 A1 Oct. 19, 2023

(51) Int. Cl.

| | |
|---|---|
| *F16D 65/12* | (2006.01) |
| *C21D 1/18* | (2006.01) |
| *B23K 26/359* | (2014.01) |
| *C21D 9/00* | (2006.01) |
| *C23C 8/32* | (2006.01) |

(52) U.S. Cl.
CPC .......... *F16D 65/127* (2013.01); *B23K 26/359* (2015.10); *C21D 1/18* (2013.01); *C21D 9/0068* (2013.01); *F16D 65/125* (2013.01); *C21D 2211/008* (2013.01); *C23C 8/32* (2013.01); *F16D 2200/0017* (2013.01); *F16D 2250/0046* (2013.01); *F16D 2250/0053* (2013.01)

(58) Field of Classification Search
CPC ........ C21D 1/18; C21D 9/0068; F16D 65/127
See application file for complete search history.

(56) References Cited

U.S. PATENT DOCUMENTS

| | | |
|---|---|---|
| 9,621,105 B2 | 4/2017 | Li et al. |
| 17,721,654 | 4/2022 | Slattery |

OTHER PUBLICATIONS

English Abstract and English Machine Translation of Zhang et al. (CN 105331778) (Feb. 17, 2016).*

* cited by examiner

*Primary Examiner* — Jessee R Roe
(74) *Attorney, Agent, or Firm* — Vivacqua Crane PLLC

(57) ABSTRACT

Systems and methods of making an enhanced brake rotor having enhanced wear resistance are provided. The systems and methods provide a vehicular rotor comprising a base comprising iron (Fe). The base comprises an outer surface having a laser-hardened portion thereon. The laser-hardened portion comprises martensite and having a thickness of between 10 and 100 microns of the outer surface to define the enhanced brake rotor with enhanced wear resistance.

10 Claims, 1 Drawing Sheet

SYSTEM AND METHOD OF MAKING AN ENHANCED BRAKE ROTOR WITH IMPROVED WEAR RESISTANCE

INTRODUCTION

The present disclosure relates to brake rotors and, more particularly, systems and methods of manufacturing brake rotors with enhanced wear resistance.

Brake rotors connect to wheels of a vehicle and are designed to turn motion (kinetic energy) into thermal energy (heat). Brake rotors provide a grip onto which respective brake pads latch when calipers apply pressure thereon. Wear resistance of brake rotors have emerged as an important field within the automotive industry, in particular, when maintaining longevity thereof along with respective brake pads.

SUMMARY

Thus, while current brake rotors achieve their intended purpose, there is a need for a new and improved system and method for manufacturing an enhanced brake rotor having improved wear resistance.

In accordance with one aspect of the present disclosure, a method of making an enhanced vehicular brake rotor having enhanced wear resistance is provided. The method comprises providing a vehicular brake rotor comprising a base comprised of iron (Fe). The base comprises an outer surface having a target portion. In this aspect, the method comprises cleaning the brake rotor to remove contamination thereon.

Further to this aspect, the method comprises laser-heating the target portion of the outer surface with a laser beam having an output of between 4000 Watts (W) and 9000 W to a temperature of between 800 degrees Celsius (° C.) and 1400° C., defining a laser-treated portion comprising austenite and having a pattern formed thereon by the laser beam. Moreover, the method comprises mass quenching the laser-treated portion to ambient temperature at a rate of about 270 degrees Celsius per second such that the austenite transforms to martensite to provide a laser-hardened portion comprising martensite. In this aspect, the laser-hardened portion has the pattern formed thereon and a thickness of between 10 and 100 microns of the outer surface, defining the enhanced brake rotor with enhanced wear and distortion resistance.

In one example of this aspect, the method may further comprise ferritic nitrocarburizing the outer surface of the brake rotor to form a ferritic nitrocarburized iron-nitride compound diffused therein for corrosion resistance.

In another example, the temperature of the target portion is between 900° C. and 1100° C. In yet another example, the temperature of the target portion is 1020° C.

In one example, the laser beam has a laser velocity of between 6000 mm/s and 12,000 mm/s. In another example, the laser beam has a laser velocity of between 8000 mm/s and 10,000 mm/s. In yet another example, the output of the laser beam is between 4800 W and 5200 W. In still another example, the output of the laser beam is 5000 W.

In one example of this aspect, the thickness of the laser-hardened portion is between 30 microns and 50 microns. In another example, the thickness of the laser-hardened portion is 40 microns.

In accordance with another aspect of the present disclosure, a system for making an enhanced vehicular brake rotor having enhanced wear resistance is disclosed. The system comprises a vehicular brake rotor comprising a base comprised of iron (Fe). The base comprises an outer surface having a target portion. In this aspect, the system comprises a cleaning unit arranged to clean the brake rotor to remove contamination therefrom. Moreover, the system comprises a laser unit having a laser tool arranged to emit a laser beam on the target portion and selectively laser-heating the target portion with the laser beam having an output of between 4000 Watts (W) and 9000 W to a temperature of between 800 degrees Celsius (° C.) and 1400° C., defining a laser-treated portion comprising austenite and having a pattern formed thereon by the laser beam.

In this aspect, the system comprises a cooling unit arranged to mass quench the laser-treated portion to ambient temperature at a rate of about 270 degrees Celsius per second such that the austenite transforms to martensite to provide a laser-hardened portion comprising martensite. The laser-hardened portion has the pattern formed thereon and a thickness of between 10 and 100 microns of the outer surface, defining the enhanced brake rotor with enhanced wear and distortion resistance.

According to this aspect, the system further comprises a controller in communication with the cleaning unit, the laser unit, and the cooling unit, and the surface hardening unit. The controller is configured to control the cleaning unit, the laser unit, the cooling unit, and the surface hardening unit. In this aspect, the system further comprises a power source configured to power the cleaning unit, the laser unit, the cooling unit, the surface hardening unit, and the controller.

In one embodiment, the system further comprises a surface hardening unit arranged to treat the brake rotor with ferritic nitrocarburizing to form a ferritic nitrocarburized iron-nitride compound diffused in the outer surface for corrosion resistance.

In another embodiment, the temperature of the target portion is between 900° C. and 1100° C. In yet another embodiment, the temperature of the target portion is 1020° C. In still another embodiment, the output of the laser beam is between 4800 W and 5200 W. In yet another embodiment, the output of the laser beam is 5000 W.

In still another aspect of the present disclosure, an enhanced brake rotor having enhanced wear resistance is disclosed. The rotor comprises a vehicular rotor comprising a base comprising iron (Fe). In this aspect, the base comprises an outer surface having a laser-hardened portion thereon. The laser-hardened portion comprises martensite and has a thickness of between 10 and 100 microns of the outer surface, defining the enhanced brake rotor with enhanced wear resistance.

In one embodiment, The outer surface comprises a ferritic nitrocarburized iron-nitride compound for corrosion resistance. In another embodiment, the thickness of the laser-hardened portion is between 30 and 50 microns. In yet another embodiment, the thickness of the laser-hardened portion is 40 microns.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Aspects of the present disclosure provide systems and methods of manufacturing an enhanced vehicular brake rotor having improved wear resistance. The systems and methods involve laser-heating a target portion of the brake rotor comprising cast iron such that the target portion comprises austenite iron. The systems and methods further involve cooling the target portion to mass quench the laser-treated portion such that the austenite iron transforms to martensite having enhance hardness and rigidity.

Figure 1:
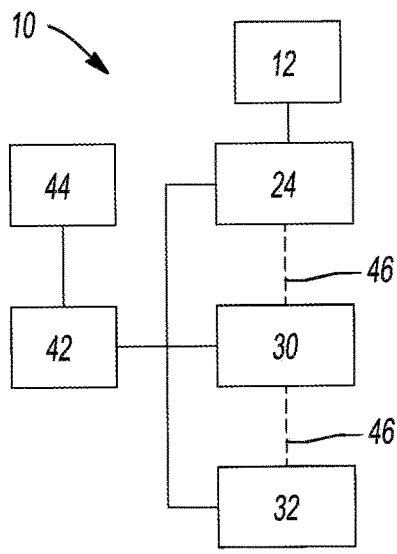
FIG. 1 is a schematic view of a system for making an enhanced vehicular brake rotor having improved wear resistance in accordance with one embodiment of the present disclosure.
Figure 2:
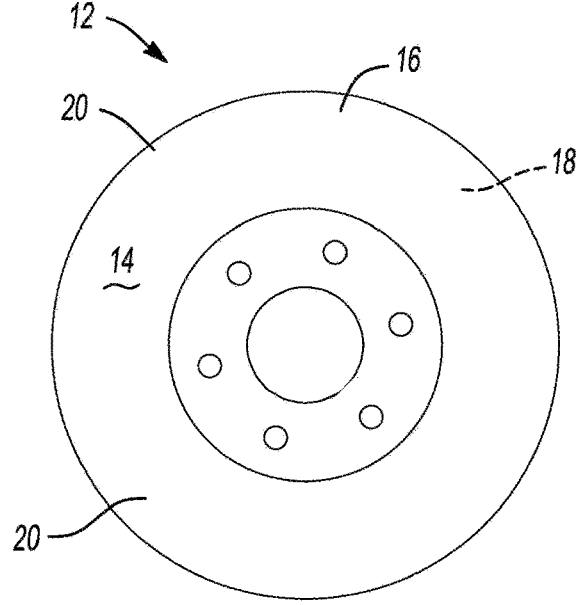
FIG. 2 is a plan view of a vehicular brake rotor implemented by the system of FIG. 1.

FIG. 1 depicts a system 10 for making an enhanced vehicular brake rotor having enhanced wear resistance in accordance with one embodiment of the present disclosure. As shown in FIGS. 1-2, the system 10 comprises a vehicular brake rotor 12. The brake rotor 12 comprises a base (or disc portion) 14 having a first side 16 and an opposing second side 18 comprised of iron (Fe). A core 19 is coaxially rotatably attached to the base 14 for connection to a wheel hub (not shown). In this embodiment, the first and second sides 16, 18 of the base 14 comprise an outer surface 20 having a target portion 22. It is to be understood that the target portion 22 may include any portion of the outer surface 20 without departing from the spirit or scope of the present disclosure. In this example, the target portion 22 is an entire area of the outer surface 20 of the base 14.

Referring back to FIG. 1, the system 10 further comprises a cleaning unit 24 arranged to clean the brake rotor 12 to remove contamination therefrom. That is, the brake rotor 12 is cleaned such that contamination (oils, debris, residue) thereon is prevented or minimized. In one embodiment, the cleaning unit 24 is arranged to apply a solvent on the brake rotor 12 to remove contamination therefrom. It is to be understood that any suitable solvent may be used to clean the brake rotor 12 such as a plasma or any solvent known in the art without departing from the spirit or scope of the present disclosure. The cleaning unit 24 is further arranged to dry the brake rotor 12 after applying solvent thereon. It is to be understood that any suitable drying method may be used without departing from the spirit or scope of the present disclosure.

Moreover, the system 10 comprises a laser unit 30 having a laser tool arranged to emit a laser beam on the target portion 22 and selectively laser-heat the target portion 22 with the laser beam such that the target portion 22 comprises austenite. That is, the laser tool is arranged to laser-heat the target portion 22 to transform the cast iron thereof to austenite. In this embodiment, the laser beam may have an output of between 4000 Watts (W) and 9000 W to laser-heat the target portion 22 to a temperature of between 800 degrees Celsius (° C.) and 1400° C., defining a laser-treated portion comprising austenite and having a pattern 38 formed thereon by the laser beam.

The pattern 38 may take on any suitable pattern formed on the outer surface 20 without departing from the scope or spirit of the present disclosure. In this example, the pattern formed by the laser beam takes on a plurality of linear lines on the target portion. However, the pattern may be a solid pattern, a dotted pattern or any other suitable pattern as desired.

More preferably, the temperature of the target portion 22 may be between 900° C. and 1100° C., and even more preferably 1020° C. Moreover, the output of the laser beam is preferably between 4800 W and 5200 W. More preferably, the output of the laser beam is 5000 W.

In one example, the laser tool is a YAG Solid State laser having a laser spot size of 4 mm, a power of 4800 W, a pattern frequency of 50 Hz, a laser beam velocity of 900 mm/s, and a hardening temperature of 1020° C. It is to be understood that other laser tools may be used without departing from the spirit or scope of the present disclosure.

Figure 3:
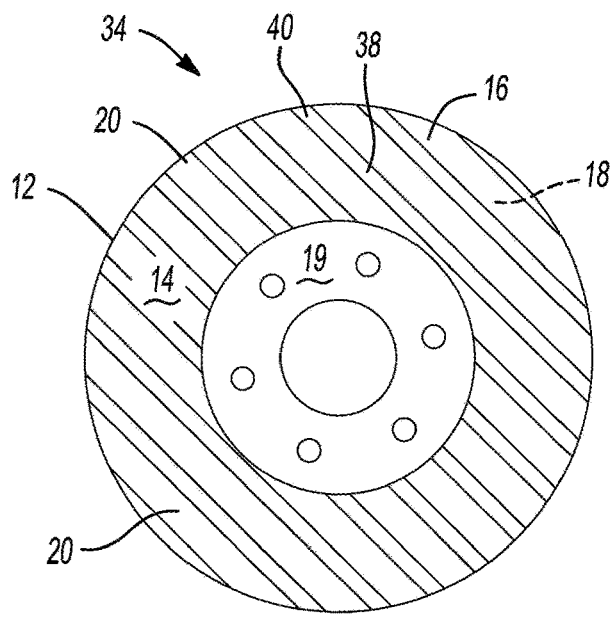
FIG. 3 is an enhanced brake rotor made with the system of FIG. 1 in one embodiment.

As shown in FIG. 1, the system 10 further comprises a cooling unit 32 arranged to mass quench the laser-treated portion such that the austenite transforms to martensite. In this embodiment, the cooling unit 32 is arranged to mass quench the laser-treated portion to ambient temperature at a rate of about 270 degrees Celsius per second such that the austenite transforms (martensitic transformation) to martensite. Mass quenching the laser-treated portion to ambient temperature defines a laser-hardened portion 40 comprising martensite (see FIG. 3). Referring to FIG. 3, the laser-hardened portion 40 has the pattern 38 formed thereon and a thickness of between 10 and 100 microns of the outer surface 20, defining the enhanced brake rotor 34 with enhanced wear and distortion resistance.

In another embodiment, the quenching rate may be between 150° C. and 350° C. per second such that the austenite transforms to untempered martensite to provide a laser-hardened portion 40 comprising martensite. Preferably, the quenching rate may be between 250° C. and 300° C. per second, more preferably between 260° C. and 280° C. per second. Even more preferably, the quenching rate may be 270° C. or about 270° C. per second.

Martensitic transformation occurs when austenite is cooled in a process called mass quenching. It is understood that, after laser-heating, unheated mass surrounding the target portion 22 cools or "mass quenches" the target portion 22 to cause a temperature drop thereof to ambient temperature. The temperature drop traps carbon atoms inside crystal structures of iron atoms. As a result, martensitic transformation occurs wherein the crystal structures change, enhancing the hardness and rigidity of the material.

Optionally, the system may include a heating unit having a heat source, such as a furnace or a laser. After mass quenching, the heating unit is arranged to heat the laser-hardened portion 40 such that martensite of the laser-hardened portion 40 transforms to tempered martensite. In one example, the laser-hardened portion 40 may be heated to between 200° C. and 600° C. More preferably, the laser-hardened portion 40 is heated to about 400° C. It is to be understood that any suitable heating source may be used to heat the laser-hardened portion 40 to transform the martensite thereof to tempered martensite without departing from the spirit or scope of the present disclosure.

Referring to FIG. 1, the system 10 further comprises a controller 42 in communication with the cleaning unit 24, the laser unit 30, and the cooling unit 32. The controller 42 is configured to control the cleaning unit 24, the laser unit 30, and the cooling unit 32. Moreover, the system 10 further comprises a power source 44 configured to power the cleaning unit 24, the laser unit 30, the cooling unit 32, and the controller 42.

In one embodiment, the system 10 may comprise a robotic unit (not shown) arranged to move the brake rotor 12 to and from the cleaning unit 24, the laser unit 30, and/or the cooling unit 32. The robotic unit may be any suitable robotic apparatus arranged to move the brake rotor 12 to and from the cleaning unit 24, the laser unit 30, and/or the cooling unit 32 without departing from the spirit or scope of the present disclosure.

In one embodiment, the units of the system 10 may be arranged to be in manufacturing communication with each other. For example, the units may be in communication by way of a moving conveyor 46 such that the brake rotor 12 may be disposed on the conveyor 46 in the cleaning unit 24 by the robotic unit. After cleaning, the brake rotor 12 may be moved from the cleaning unit 24 to the laser unit 30 by way of the conveyor 46. After heating, the brake rotor 12 may be moved from the laser unit 30 to the cooling unit 32 by way of the conveyor 46 (or the robotic unit). After cooling, brake rotor 12 may be moved from the cooling unit 32 to a machining area or an inspection area by way of the robotic unit (or manually by hand).

In one embodiment, the system 10 further comprises a surface hardening unit (not shown) arranged to treat the brake rotor 12 with ferritic nitrocarburizing (FNC) to form a ferritic nitrocarburized iron-nitride compound diffused in the outer surface 20 for corrosion resistance. FNC is a case hardening process that is used to produce a hard, wear-resistant surface on most cast irons. The FNC process involves diffusing nitrogen and carbon into ferrous metal parts. The process may be used to improve wear and fatigue properties and to enhance corrosion resistance. Example FNC processes may be found in U.S. Pat. Nos. 8,287,667 and 9,651,105, the contents of which are incorporated herein by reference in their entirety.

Figure 4:
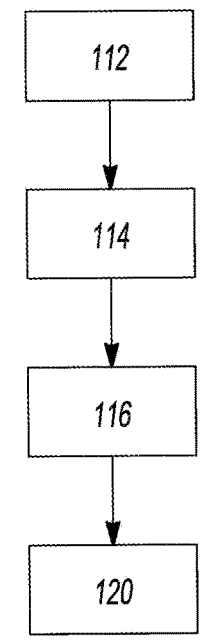
FIG. 4 is a flowchart of a method of making an enhanced vehicular brake rotor with the system of FIG. 1 in accordance with one example of the present disclosure.

FIG. 4 depicts a method 110 of making an enhanced vehicular brake rotor having enhanced wear resistance by way of the system 10 of FIG. 1 in accordance with one example of the present disclosure. As shown, the method 110 comprises in box 112 providing a vehicular brake rotor 12 (FIG. 2). The brake rotor 12 comprises a base (or disc portion) 14 having a first side 16 and an opposing second side 18 comprised of iron (Fe). A core 19 is coaxially rotatably attached to the base 14 for connection to a wheel hub (not shown). In this embodiment, the base 14 comprises an outer surface 20 having a target portion 22. It is to be understood that the target portion 22 may include any portion of the outer surface 20 without departing from the spirit or scope of the present disclosure. In this example, the target portion 22 is an entire area of the outer surface 20 of the base 14.

As shown in FIG. 4, the method 110 comprises in box 114 cleaning the brake rotor 12 to remove contamination thereon. In this example, the step of cleaning may be accomplished by the cleaning unit 24 (FIG. 1) which is arranged to clean the brake rotor 12 to remove contamination thereon. That is, the brake rotor 12 is cleaned such that contamination (oils, debris, residue) thereon is prevented or minimized.

In one example, the step of cleaning may comprise applying a solvent on the brake rotor 12 to remove contamination therefrom. It is to be understood that any suitable solvent may be used to clean the brake rotor 12 such as a plasma or any solvent known in the art without departing from the spirit or scope of the present disclosure. Moreover, the step of cleaning comprises drying the brake rotor 12 after applying solvent thereon. It is to be understood that any suitable drying method may be used without departing from the spirit or scope of the present disclosure.

Moreover, the method 110 further comprises in box 116 laser-heating the target portion 22 of the outer surface 20 with a laser beam having an output of between 4000 Watts (W) and 9000 W to a temperature of between 800 degrees Celsius (° C.) and 1400° C., defining a laser-treated portion comprising austenite. The laser-treated portion has a pattern 38 formed thereon by the laser beam. Preferably, the temperature of the target portion 22 is between 900° C. and 1100° C. More preferably, the temperature of the target portion 22 is 1020° C.

In this example, the step of laser-heating may be accomplished by the laser unit 30 (FIG. 1) having a laser tool arranged to emit a laser beam on the target portion 22 and selectively laser-heating the target portion 22 with the laser beam. As discussed, the laser tool is arranged to emit the laser beam on the target portion 22 and selectively laser-heat the target portion 22 with an output as desired, such as between 4000 Watts (W) and 9000 W, to heat the target portion 22 as desired, such as between 800 degrees Celsius (° C.) and 1400° C., defining a laser-treated portion 40 comprising austenite and having the pattern 38 formed thereon. Other output ranges and temperature ranges may be used without departing from the spirit or scope of the present disclosure.

In one example, the laser tool may be a YAG Solid State laser having a laser spot size of 4 mm, a power of 4800 W, a pattern frequency of 50 Hz, a laser beam velocity of 900 mm/s, and a hardening temperature of 1020° C. It is to be understood that other laser tools may be used without departing from the spirit or scope of the present disclosure.

In one example, the laser beam has a laser velocity of between 6000 mm/s and 12,000 mm/s. Preferably, the laser beam has a laser velocity of between 8000 mm/s and 10,000 mm/s. Moreover, the output of the laser beam may be between 4800 W and 5200 W. More preferably, the output of the laser beam may be 5000 W.

Referring to FIG. 4, the method 110 comprises in box 120 mass quenching the laser-treated portion to ambient temperature at a quenching rate of between 150° C. and 350° C. per second such that the austenite transforms to martensite to provide a laser-hardened portion 40 comprising martensite. Preferably, the quenching rate may be between 250° C. and 300° C. per second, more preferably between 260° C. and 280° C. per second. Even more preferably, the quenching rate may be 270° C. or about 270° C. per second such that the austenite transforms to martensite to provide a laser-hardened portion 40 comprising martensite.

In this example, the laser-hardened portion 40 has the pattern 38 formed thereon and a thickness of between 10 and 100 microns of the outer surface 20, defining the enhanced brake rotor with enhanced wear and distortion resistance. Preferably, the thickness of the laser-hardened portion 40 is between about 30 microns and about 50 microns. More preferably, the thickness of the laser-hardened portion 40 is 40 microns or about 40 microns.

Optionally, after mass quenching, the method may include heating the laser-hardened portion 40 such that the laser-hardened portion 40 comprises tempered martensite. Heating the laser-hardened portion may be accomplished by the heating unit discussed above such as a furnace or a laser. As mentioned above, the laser-hardened portion 40 may be heated to between 200° C. and 600° C. More preferably, the laser-hardened portion 40 is heated to about 400° C. It is to be understood that any suitable heating source may be used to heat the laser-hardened portion 40 to transform the martensite thereof to tempered martensite without departing from the spirit or scope of the present disclosure.

In one example of this aspect, the method 110 may further comprise ferritic nitrocarburizing (FNC) the outer surface 20 of the brake rotor to form a ferritic nitrocarburized iron-nitride compound diffused therein for corrosion resistance. In this example, a surface hardening unit of FIG. 1 is implemented. As discussed, the surface hardening unit is arranged to treat the brake rotor with ferritic nitrocarburizing to form a ferritic nitrocarburized iron-nitride compound diffused in the outer surface 20 for corrosion resistance.

As known, FNC is a case hardening process that is used to produce a hard, wear-resistant surface on most cast irons. The FNC process involves diffusing nitrogen and carbon into ferrous metal parts. The process may be used to improve wear and fatigue properties and to enhance corrosion resistance. Example FNC processes may be found in U.S. Pat. Nos. 8,287,667 and 9,651,105, the contents of which are incorporated herein by reference in their entirety.

With the system 10 of FIG. 1 implementing the method 110 of FIG. 4, an enhanced brake rotor 34 having improved wear resistance is provided in FIG. 3. As shown, the enhanced brake rotor 34 comprises the brake rotor 12 comprising the base 14 comprising iron (Fe). In this embodiment, the base 14 comprises the outer surface 20 having the laser-hardened portion 40 with a pattern 38 thereon. The laser-hardened portion 40 comprises martensite and has a thickness of between 10 and 100 microns of the outer surface 20, defining the enhanced brake rotor 34 with enhanced wear resistance. Furthermore, the outer surface 20 may comprise a ferritic nitrocarburized iron-nitride compound for corrosion resistance.

It is to be understood that the thickness of the laser-hardened portion 40 may vary. For example, the thickness of the laser-hardened portion 40 may be between about 30 microns and about 50 microns. More preferably, the thickness of the laser-hardened portion 40 may be 40 microns or about 40 microns.

It is to be understood that the term "about" used herein means up to +/−10% of the value of the parameter. For example, about 270° C. may include a range of between 243° C. and 297° C. In another example, about 40 microns may include a range of between 36 microns and 44 microns.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of making an enhanced vehicular brake rotor having enhanced wear resistance, the method comprising:
providing a vehicular brake rotor comprising a base comprised of iron (Fe), the base comprising an outer surface having a target portion;
cleaning the brake rotor to remove contamination thereon;
laser-heating the target portion of the outer surface with a laser beam having an output of between 4000 Watts (W) and 9000 W to a temperature of between 800 degrees Celsius (° C.) and 1400° C., defining a laser-treated portion comprising austenite and having a pattern formed thereon by the laser beam; and
mass quenching the laser-treated portion to ambient temperature at a rate of about 270 degrees Celsius per second such that the austenite transforms to martensite to provide a laser-hardened portion comprising martensite, the laser-hardened portion having the pattern formed thereon and a thickness of between 10 and 100 microns of the outer surface, defining the enhanced brake rotor with enhanced wear and distortion resistance.

2. The method of claim 1 further comprising ferritic nitrocarburizing the outer surface of the brake rotor to form a terrific nitrocarburized iron-nitride compound diffused therein for corrosion resistance.

3. The method of claim 1 wherein the temperature of the target portion is between 900° C. and 1100° C.

4. The method of claim 1 wherein the temperature of the target portion is 1020° C.

5. The method of claim 1 wherein the laser beam has a laser velocity of between 6000 mm/s and 12,000 mm/s.

6. The method of claim 1 wherein the laser beam has a laser velocity of between 8000 mm/s and 10,000 mm/s.

7. The method of claim 1 wherein the output of the laser beam is between 4800 W and 5200 W.

8. The method of claim 1 wherein the output of the laser beam is 5000 W.

9. The method of claim 1 wherein the thickness of the laser-hardened portion is between 30 microns and 50 microns.

10. The method of claim 1 wherein the thickness of the laser-hardened portion is 40 microns.

\* \* \* \* \*